United States Patent
Nakano

(10) Patent No.: US 12,131,457 B2
(45) Date of Patent: Oct. 29, 2024

(54) IMAGE PROCESSING DEVICE AND IMAGE PROCESSING METHOD

(71) Applicant: MINEBEA MITSUMI Inc., Nagano (JP)

(72) Inventor: Yoshihiro Nakano, Yokohama (JP)

(73) Assignee: MINEBEA MITSUMI Inc., Nagano (JP)

( * ) Notice: Subject to any disclaimer, the term of this patent is extended or adjusted under 35 U.S.C. 154(b) by 358 days.

(21) Appl. No.: 17/755,409

(22) PCT Filed: Oct. 29, 2020

(86) PCT No.: PCT/JP2020/040701
§ 371 (c)(1),
(2) Date: Apr. 28, 2022

(87) PCT Pub. No.: WO2021/085560
PCT Pub. Date: May 6, 2021

(65) Prior Publication Data
US 2022/0351363 A1    Nov. 3, 2022

(30) Foreign Application Priority Data
Oct. 31, 2019    (JP) ................. 2019-199417

(51) Int. Cl.
*G06T 7/00*    (2017.01)
*G06T 7/33*    (2017.01)
*G06T 7/70*    (2017.01)

(52) U.S. Cl.
CPC ............. *G06T 7/0004* (2013.01); *G06T 7/33* (2017.01); *G06T 7/70* (2017.01); *G06T 2207/30164* (2013.01)

(58) Field of Classification Search
CPC ........... G06T 7/0004; G06T 7/33; G06T 7/70; G06T 2207/30164; G06T 2207/10012;
(Continued)

(56) References Cited

U.S. PATENT DOCUMENTS

| 11,954,886 B2* | 4/2024 | Taamazyan ........... G06V 10/147 |
| 2012/0148145 A1* | 6/2012 | Liu ............................ G06T 7/80 |
| | | 382/154 |

(Continued)

FOREIGN PATENT DOCUMENTS

| JP | 2017-131990 A | 8/2017 |
| JP | 2018-010359 A | 1/2018 |

(Continued)

OTHER PUBLICATIONS

English translation of the Written Opinion for corresponding International Application No. PCTJP2020/040701 dated Dec. 28, 2020.
(Continued)

*Primary Examiner* — Roy M Punnoose
(74) *Attorney, Agent, or Firm* — Pearne & Gordon LLP

(57) ABSTRACT

An image processing device (10) according to an aspect of the present invention includes an acquiring section (151) and an estimation section (152). The acquiring section (151) acquires a first image and a second image obtained by capturing randomly stacked workpieces (W1a, W1b). The estimation section (152) generates a matching map of a feature of the first image and a feature of the second image, estimates a position, an orientation and a classification score of each workpiece as a target for each of the first image and the second image, and estimates the position of the workpiece, based on a matching result using the matching map and an estimation result of the position.

4 Claims, 17 Drawing Sheets

(58) Field of Classification Search
CPC . G06T 2207/20084; G06T 7/593; G06T 7/75; G06T 7/00; G06T 7/55; B25J 13/08
See application file for complete search history.

(56) References Cited

U.S. PATENT DOCUMENTS

| | | | |
|---|---|---|---|
| 2018/0137607 A1 | 5/2018 | Mishma et al. | |
| 2018/0137629 A1 | 5/2018 | Mishma et al. | |
| 2019/0091869 A1* | 3/2019 | Yamazaki | B25J 15/08 |
| 2021/0023717 A1* | 1/2021 | Yu | B25J 9/1687 |
| 2022/0343537 A1* | 10/2022 | Taamazyan | G06V 10/82 |
| 2022/0375125 A1* | 11/2022 | Taamazyan | G06T 7/269 |
| 2022/0405506 A1* | 12/2022 | Taamazyan | G06T 7/50 |

FOREIGN PATENT DOCUMENTS

| | | |
|---|---|---|
| JP | 2018-084571 A | 5/2018 |
| JP | 2019-058960 A | 4/2019 |

OTHER PUBLICATIONS

Extended European Search Report dated Oct. 24, 2023 for corresponding European Application No. 20882857.4.

Xiang et al., "PoseCNN: A Convlutional Neural Network for 6D Object Pose Estimation in Cluttered Scenes", arXiv:1711.00199v1 [cs.CV] Nov. 1, 2017.

Li et al., "A Unified Framework for Multi-view Multi-class Object Pose Estimation", Department of Computer Science, Johns Hokpins University, Baltimore, MD, USA, 2018, pp. 263-281.

Yoshihiro Nakano, "Stereo Vision Based Single-Shot 6D Object Pose Estimation for Bin-Picking by a Robot Manipulator", May 28, 2020, arXiv:2005.13759 [cs.CV], https://doi.org/10.48550/arXiv.2005.13759.

International Search Report for corresponding International Application No. PCTJP2020/040701 mailed Dec. 28, 2020.

Written Opinion for corresponding International Application No. PCTJP2020/040701 dated Dec. 28, 2020.

Xue, Li-wei, et al., "Object Recognition and Pose Estimation base on Deep Learning", IEEE International Conference on Robotics and Biomimetics (ROBIO), 2017.

Liu, Guodong, et al., "Binocular Depth Estimation Using Convolutional Neural Network With Siamese Branches", IEEE International Conference on Robotics and Biomimetics (ROBIO), 2019.

Duan, Chenyang, et al., "Parallax-Based Spatial and Channel Attention for Stereo Image Super-Resolution", IEEE Access (vol. 7), 2019.

* cited by examiner

IMAGE PROCESSING DEVICE AND IMAGE PROCESSING METHOD

TECHNICAL FIELD

The present invention relates to an image processing device and an image processing method.

BACKGROUND ART

A technique of recognizing the three-dimensional positions and orientations of a plurality of randomly stacked objects (workpieces) to grasp the workpieces with a robot arm and the like is known. In this case, the three-dimensional positions and orientations of the workpieces can be recognized by using three-dimensional measurement machines.

CITATION LIST

Patent Literature

Patent Document 1: JP 2019-058960 A

SUMMARY OF INVENTION

Technical Problem

However, since three-dimensional measurement machines are expensive, it is costly to introduce a large number of the three-dimensional measurement machines in factories, or the like. Therefore, it is desirable to recognize the position and orientation of an object from a two-dimensional image taken by a photographic device such as a common camera.

The above-mentioned problem is an example, and an object of the present invention is to provide an image processing device and an image processing method for estimating the position of an object.

Solution to Problem

An image processing device according to an aspect of the present invention includes an acquiring section and an estimation section. The acquiring section acquires a first image and a second image obtained by capturing randomly stacked workpieces. The estimation section generates a matching map of a feature of the first image and a feature of the second image, estimates a position, an orientation and a classification score of each workpiece as a target for each of the first image and the second image, and estimates the position of the workpiece, based on a matching result using the matching map and an estimation result of the position.

Advantageous Effects of Invention

According to an aspect of the present invention, the position of an object can be estimated through an image processing.

DESCRIPTION OF EMBODIMENTS

Figure 1:
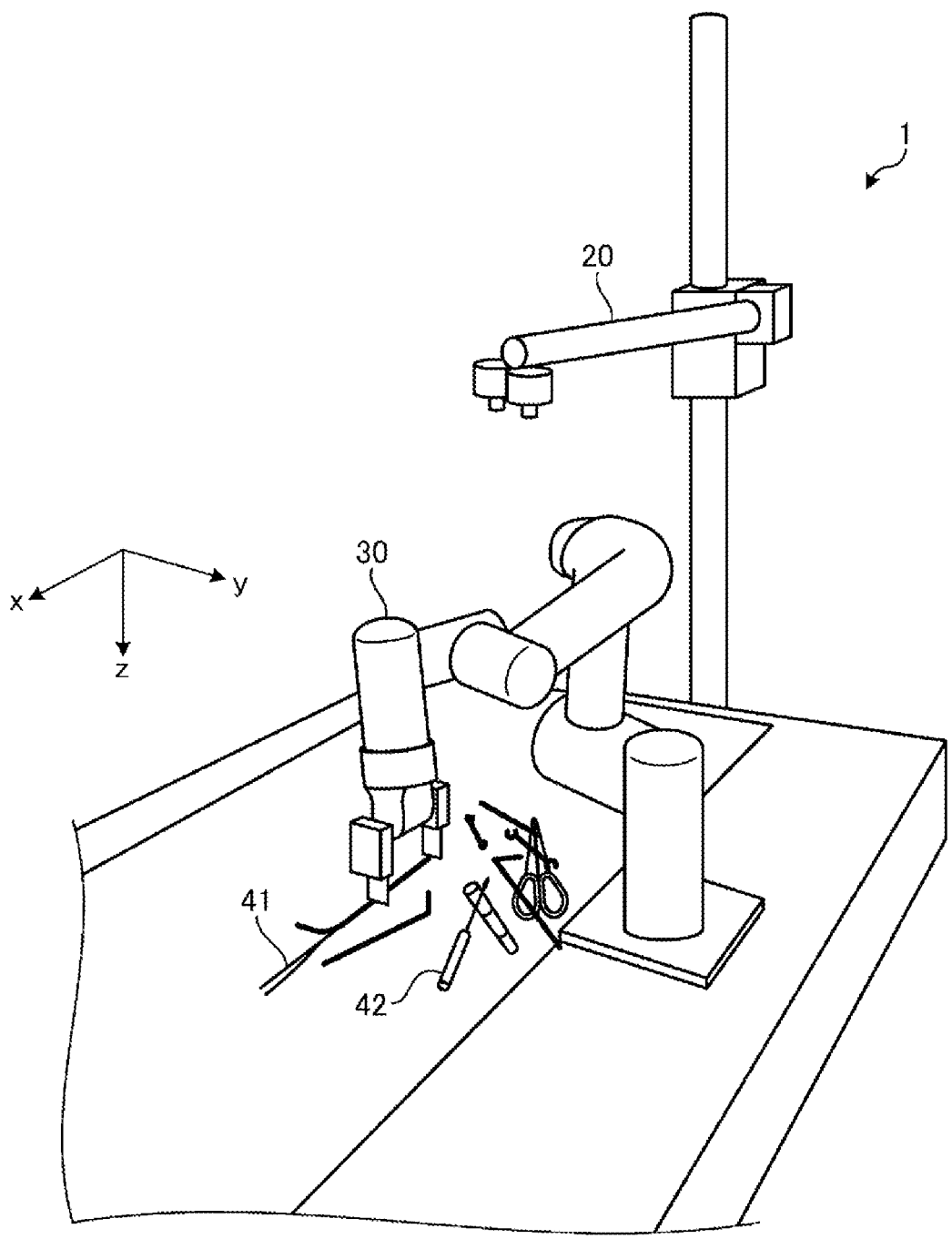
FIG. 1 is a diagram illustrating an example of an object grasping system equipped with an image processing device according to a first embodiment.

An image processing device and an image processing method according to an embodiment will be described below with reference to the accompanying drawings. Note that the present invention is not limited to the embodiment described above. Further, the dimensional relationships, proportions, and the like between elements in the drawings may differ from reality. Among the drawings, parts having mutually different dimensional relationships and proportions may be included. Furthermore, the contents described in one embodiment or modification example are applied in principle to other embodiments or modification examples.

First Embodiment

The image processing device of the first embodiment is used in an object grasping system 1, for example. FIG. 1 is a diagram illustrating an example of an object grasping system equipped with an image processing device according to the first embodiment. The object grasping system 1 illustrated in FIG. 1 includes an image processing device 10 not illustrated in the drawing, a camera 20, and a robot arm 30. The camera 20 is provided at a position where the camera 20 can capture both the robot arm 30 and randomly stacked workpieces 41 and 42 and the like as objects to be grasped by the robot arm 30, for example. The camera 20 captures the robot arm 30 and the workpieces 41 and 42 and outputs the captured image to the image processing device 10, for example. Note that the robot arm 30, the randomly stacked workpieces 41 and 42, and the like may be captured by different cameras. As illustrated in FIG. 1, a camera capable of capturing a plurality of images such as a publicly known stereo camera is used for the camera 20 of the first embodiment, for example. The image processing device 10 estimates the positions and orientations of the workpieces 41 and 42 and the like by using the image output from the camera 20. The image processing device 10 outputs a signal for controlling an operation of the robot arm 30 on the basis of the estimated positions and orientations of the workpieces 41 and 42 and the like. The robot arm 30 performs an operation of grasping the workpieces 41 and 42 and the like on the basis of the signal output from the image processing device 10. Note that while FIG. 1 illustrates a plurality of the workpieces 41 and 42 and the like of different types, the number of types of the workpieces may be one. The first embodiment describes a case where the number of types of the workpieces is one. In addition, the workpieces 41 and 42 and the like are disposed in irregular positions and orientations. As illustrated in FIG. 1, for example, a plurality of workpieces may be disposed in an overlapping manner in top view. In addition, the workpieces 41 and 42 are examples of the object.

Figure 2:
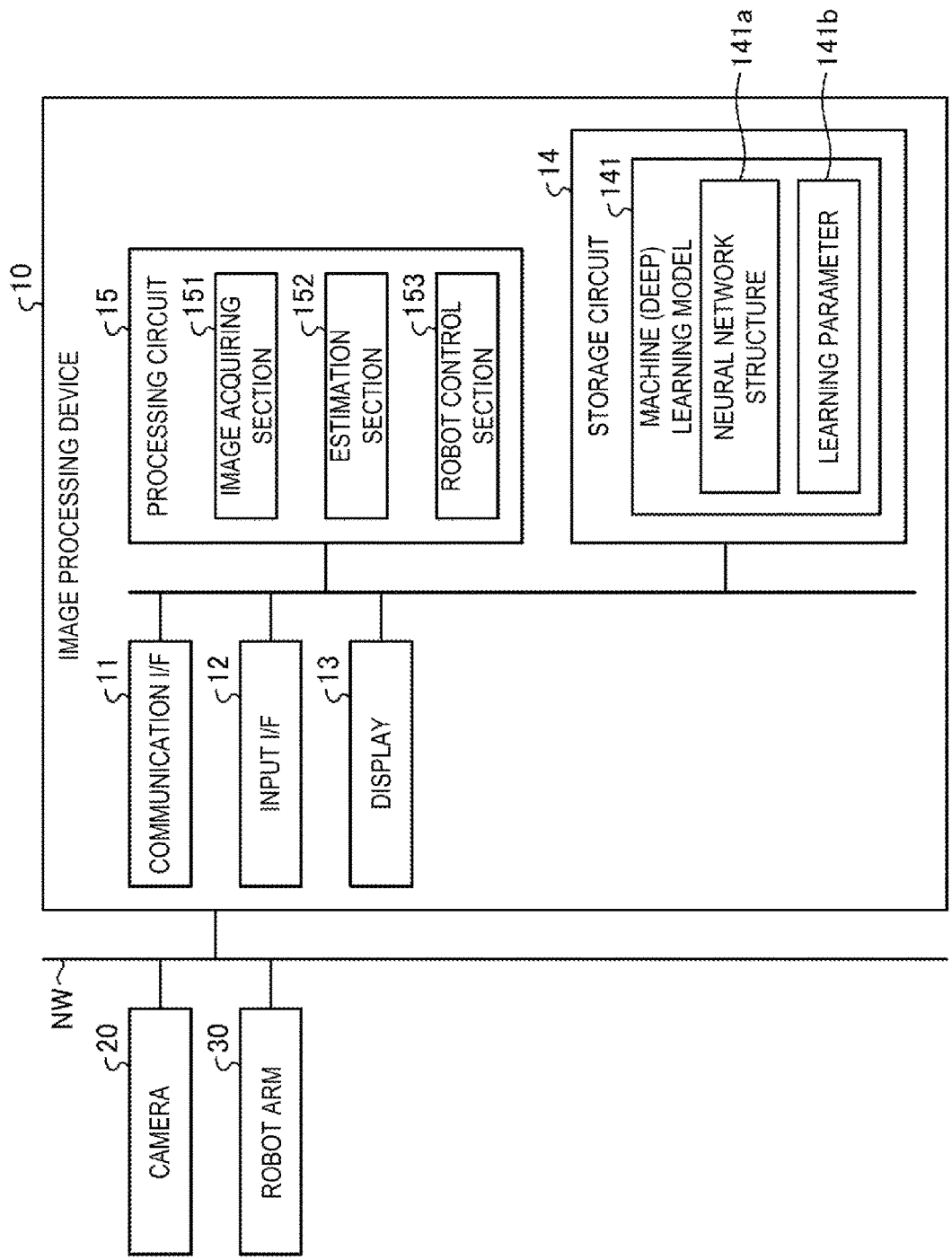
FIG. 2 is a block diagram illustrating an example of a configuration of the object grasping system according to the first embodiment.

FIG. 2 is a block diagram illustrating an example of a configuration of the object grasping system according to the first embodiment. As illustrated in FIG. 2, the image processing device 10 is communicatively connected with the camera 20 and the robot arm 30 through a network NW. In addition, as illustrated in FIG. 2, the image processing device 10 includes a communication interface (I/F) 11, an input I/F 12, a display 13, a storage circuit 14, and a processing circuit 15.

The communication I/F 11 controls communication for data input/output with an external apparatus through the network NW. For example, the communication I/F 11 is implemented by a network card, a network adapter, a network interface controller (NIC) and the like, and the communication I/F 11 receives data of the image output from the camera 20 and transmits a signal to be output to the robot arm 30.

The input I/F 12 is connected to the processing circuit 15, and the input I/F 12 converts an input operation received from an administrator (not illustrated) of the image processing device 10 into an electric signal and outputs the signal to the processing circuit 15. For example, the input I/F 12 is a switch button, a mouse, a keyboard, a touch panel and the like.

The display 13 is connected to the processing circuit 15, and displays various types of information and various types of image data output from the processing circuit 15. For example, the display 13 is implemented by a liquid crystal monitor, a cathode ray tube (CRT) monitor, a touch panel and the like.

The storage circuit 14 is implemented by a storage apparatus such as a memory, for example. The storage circuit 14 stores various types of programs executed by the processing circuit 15. In addition, the storage circuit 14 temporarily stores various types of data used when various types of programs are executed by the processing circuit 15.

The storage circuit 14 includes a machine (deep) learning model 141. Further, the machine (deep) learning model 141 includes a neural network structure 141a and a learning parameter 141b. The neural network structure 141a is application of a publicly known network such as a convolutional neural network b1 of FIG. 8, and is a network structure illustrated in FIG. 15 described later. The learning parameter 141b is a weight of a convolutional filter of a convolutional neural network, and is a parameter that is learned and optimized for estimation of the position and the orientation of the object, for example. The neural network structure 141a may be provided in an estimation section 152. Regarding the machine (deep) learning model 141 of the present invention, a model having performed learning will be described as an example, but the machine (deep) learning model 141 is not limited to this example. Note that in the following description, the machine (deep) learning model 141 may be simply referred to as "learning model 141".

The learning model 141 is used for processing of estimating the position and the orientation of the workpiece from the image output from the camera 20. The learning model 141 is generated by learning the positions and orientations of a plurality of workpieces and captured images of the plurality of workpieces as teacher data, for example. Note that while the learning model 141 is generated by the processing circuit 15 in the first embodiment, the embodiment is not limited to this, and the learning model 141 may be generated by an external computer, for example. Hereinafter, an embodiment of generating and updating the learning model 141 by using a learning apparatus not illustrated will be described.

Figure 3:
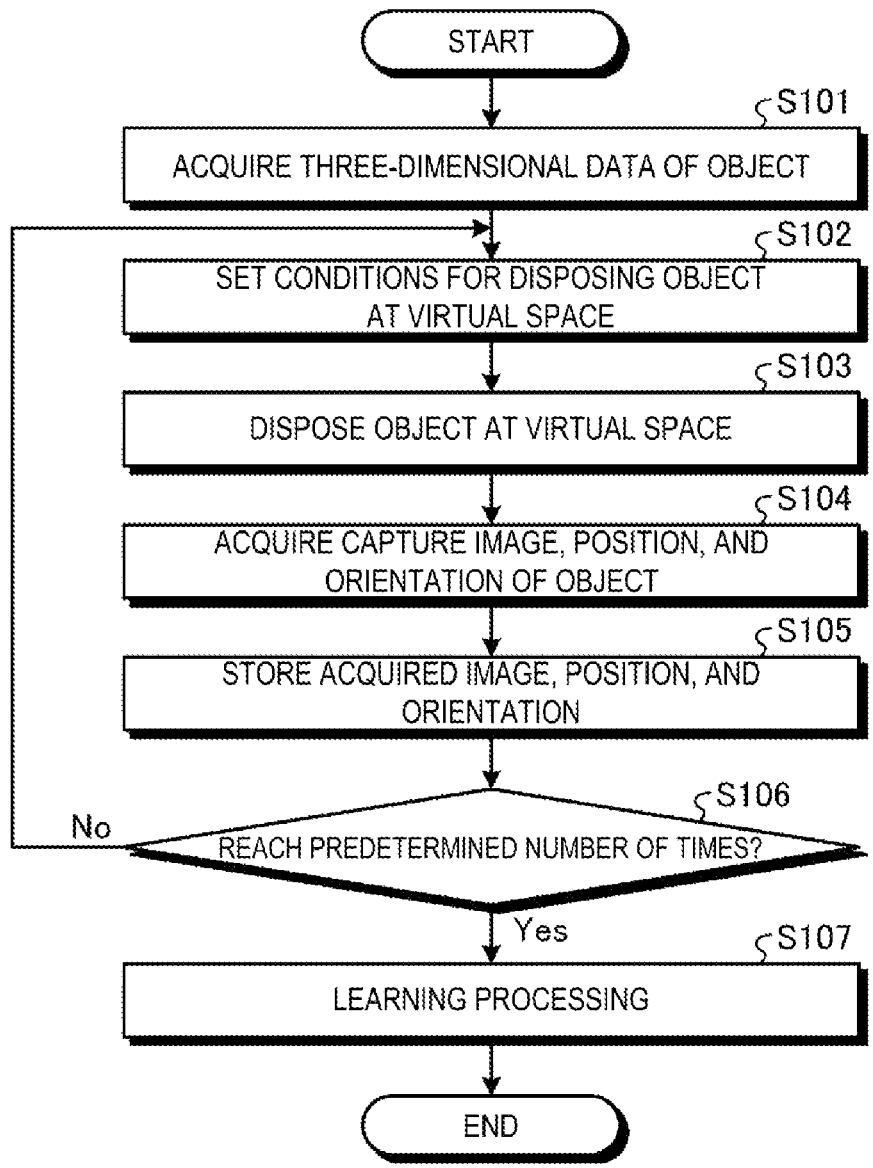
FIG. 3 is a flowchart illustrating an example of learning processing.
Figure 4:
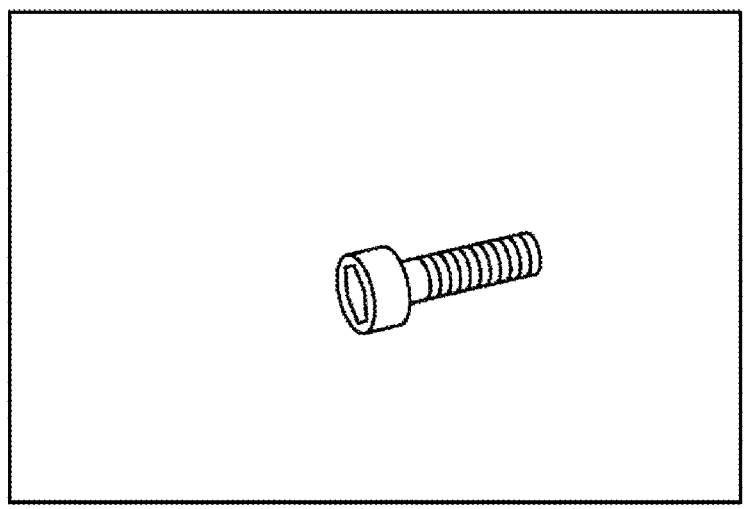
FIG. 4 is a diagram illustrating an example of three-dimensional data of an object.

In the first embodiment, a large number of images used for generating the learning model 141 may be generated by disposing a plurality of workpieces at a virtual space and capturing images of the virtual space, for example. FIG. 3 is a flowchart illustrating an example of learning processing. As illustrated in FIG. 3, the learning apparatus acquires the three-dimensional data of an object (step S101). The three-dimensional data can be acquired by a method such as publicly known 3D scanning, for example. FIG. 4 is a diagram illustrating an example of the three-dimensional data of the object. By acquiring the three-dimensional data, the workpiece can be disposed with the orientation of the workpiece freely changed at the virtual space.

Figure 5:
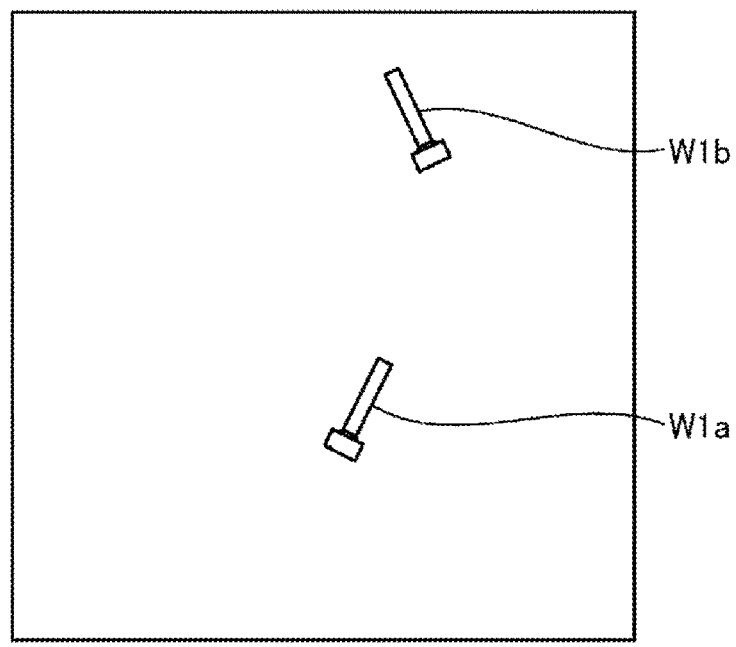
FIG. 5 is a diagram illustrating an example of a captured image of a virtual space where a plurality of objects are disposed.

Next, the learning apparatus sets various types of conditions for disposing the object at the virtual space (step S102). The object can be disposed at the virtual space by using publicly known image generation software and the like, for example. Regarding the conditions such as the number, positions, and orientations of the objects to be disposed, the image generation software may generate the objects at random, but the conditions are not limited to this, and the administrator of the image processing device 10 may freely set the conditions. Next, the learning apparatus disposes the object at the virtual space in accordance with the set conditions (step S103). Next, by capturing the virtual space where the plurality of objects are disposed, the learning apparatus acquires the image, positions and orientations of the disposed objects (step S104), for example. In the first embodiment, the position and the orientation of the object are represented by three-dimensional coordinates (x, y, z), and the orientation of the object is represented by a quaternion (qx, qy, qz, qw) representing the orientation or the rotation state of the object, for example. FIG. 5 is a diagram illustrating an example of a captured image of a virtual space where a plurality of objects are disposed. As illustrated in FIG. 5, a plurality of objects W1a and W1b are disposed at the virtual space in random positions and orientations. In addition, in the following description, an image of the objects disposed at random may be referred to as a "random stack image". Next, the learning apparatus stores the acquired image and the positions and the orientations of the disposed objects in the storage circuit 14 (step S105). Further, the learning apparatus repeats step S102 to step S105 predetermined times (step S106). Note that the combination of the image and the positions and the orientations of the disposed objects acquired in the above-mentioned step and stored in the storage circuit 14 may be referred to as "teacher data". By repeating the processing from step S102 to step S105 predetermined times, a sufficient number of teacher data for repeating the learning processing is generated.

Then, by performing the learning processing the predetermined times by using the generated teacher data, the learning apparatus generates or updates the learning parameter 141*b* to be used as a weight by the neural network structure 141*a* (step S107). In this manner, by disposing the object whose three-dimensional data has been acquired at the virtual space, the teacher data used for the learning processing and including the image and the combination of the position and the orientation of the object can be easily generated.

Returning to FIG. 2, the processing circuit 15 is implemented by a processor such as a central processing unit (CPU). The processing circuit 15 controls the entire image processing device 10. The processing circuit 15 executes various types of processing by reading various types of programs stored in the storage circuit 14 and executing the read programs. For example, the processing circuit 15 includes an image acquiring section 151, an estimation section 152, and a robot control section 153.

Through the communication I/F 11, the image acquiring section 151 acquires a random stack image, and outputs the random stack image to the estimation section 152, for example. The image acquiring section 151 is an example of the acquiring section.

The estimation section 152 estimates the position and the orientation of the object by using the output random stack image. The estimation section 152 performs estimation processing on the image of the object by using the learning model 141, and outputs an estimation result to the robot control section 153, for example. Note that the estimation section 152 may further estimate the position and the orientation of a tray and the like where the object is disposed, for example. The configuration for estimating the position and the orientation of the tray will be described later.

On the basis of the estimated position and orientation of the object, the robot control section 153 generates a signal for controlling the robot arm 30, and outputs the signal to the robot arm 30 through the communication I/F 11. The robot control section 153 acquires information related to the current position and orientation of the robot arm 30, for example. Then, the robot control section 153 generates the trajectory of the movement when the robot arm 30 grasps the object in accordance with the current position and orientation of the robot arm 30 and the estimated position and orientation of the object. Note that the robot control section 153 may modify the trajectory of the movement of the robot arm 30 on the basis of the position and the orientation of the tray and the like.

Figure 6:
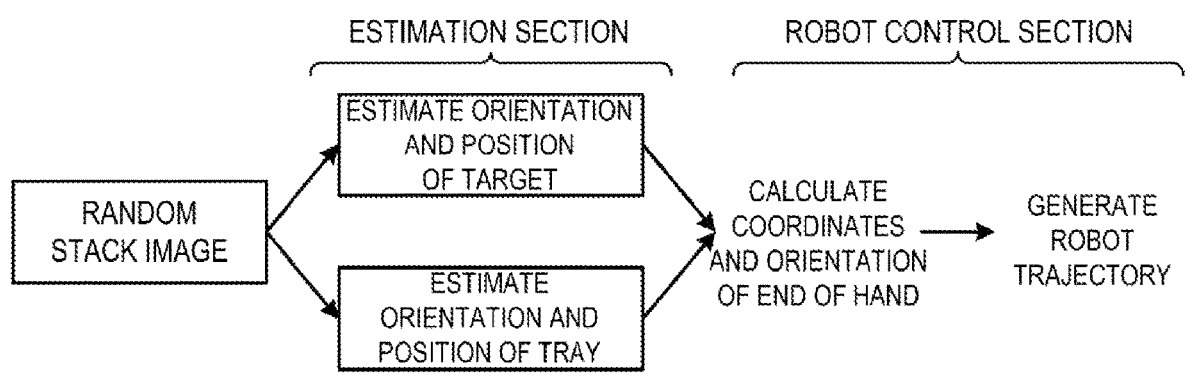
FIG. 6 is a diagram illustrating an example of processing related to control of a robot arm.

FIG. 6 is a diagram illustrating an example of processing related to control of the robot arm. As illustrated in FIG. 6, the estimation section 152 estimates the position and the orientation of the targeted object from a random stack image. In the same manner, the estimation section 152 may estimate the position and the orientation of the tray and the like where the object is disposed from the random stack image. From the models of the estimated object, tray and the like, the robot control section 153 calculates the coordinates of the position and the orientation of the end of the hand of the robot arm 30, and generates the trajectory of the robot arm 30.

Figure 7:
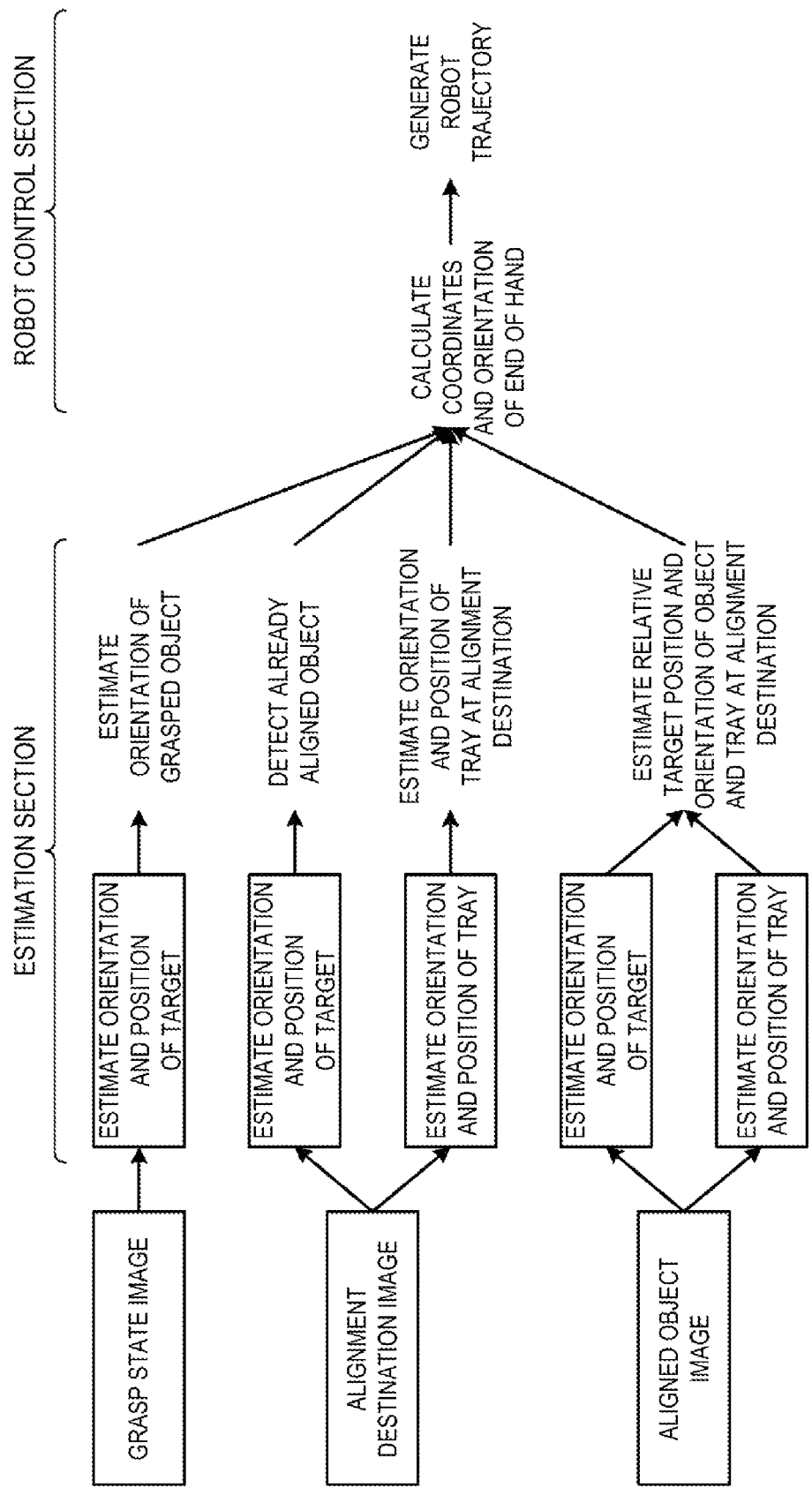
FIG. 7 is a diagram illustrating another example of processing related to control of the robot arm.

Note that the robot control section 153 may further output a signal for controlling the operation of the robot arm 30 for aligning the grasped object after the robot arm 30 has grasped the object. FIG. 7 is a diagram illustrating another example of processing related to control of the robot arm. As illustrated in FIG. 7, the image acquiring section 151 acquires a captured image of the object grasped by the robot arm 30 captured by the camera 20. The estimation section 152 estimates the position and the orientation of the object grasped by the robot arm 30 as a target, and outputs the estimated position and the orientation to the robot control section 153. In addition, the image acquiring section 151 may further acquire the image of the tray and the like at an alignment destination being a destination where the grasped object is to be moved, the image being captured by the camera 20. At this time, the image acquiring section 151 further acquires an image of an object already aligned at the tray and the like at the alignment destination (aligned object image). From the image of the alignment destination or the aligned object image, the estimation section 152 estimates the position and the orientation of the tray and the like at the alignment destination, and the position and the orientation of the already aligned object. Then, on the basis of the estimated position and orientation of the object grasped by the robot arm 30, the estimated position and orientation of the tray and the like at the alignment destination, and the estimated position and the orientation of the already aligned object, the robot control section 153 calculates the coordinates of the position and the orientation of the end of the hand of the robot arm 30, and generates the trajectory of the robot arm 30 when the object is aligned.

Figure 8:
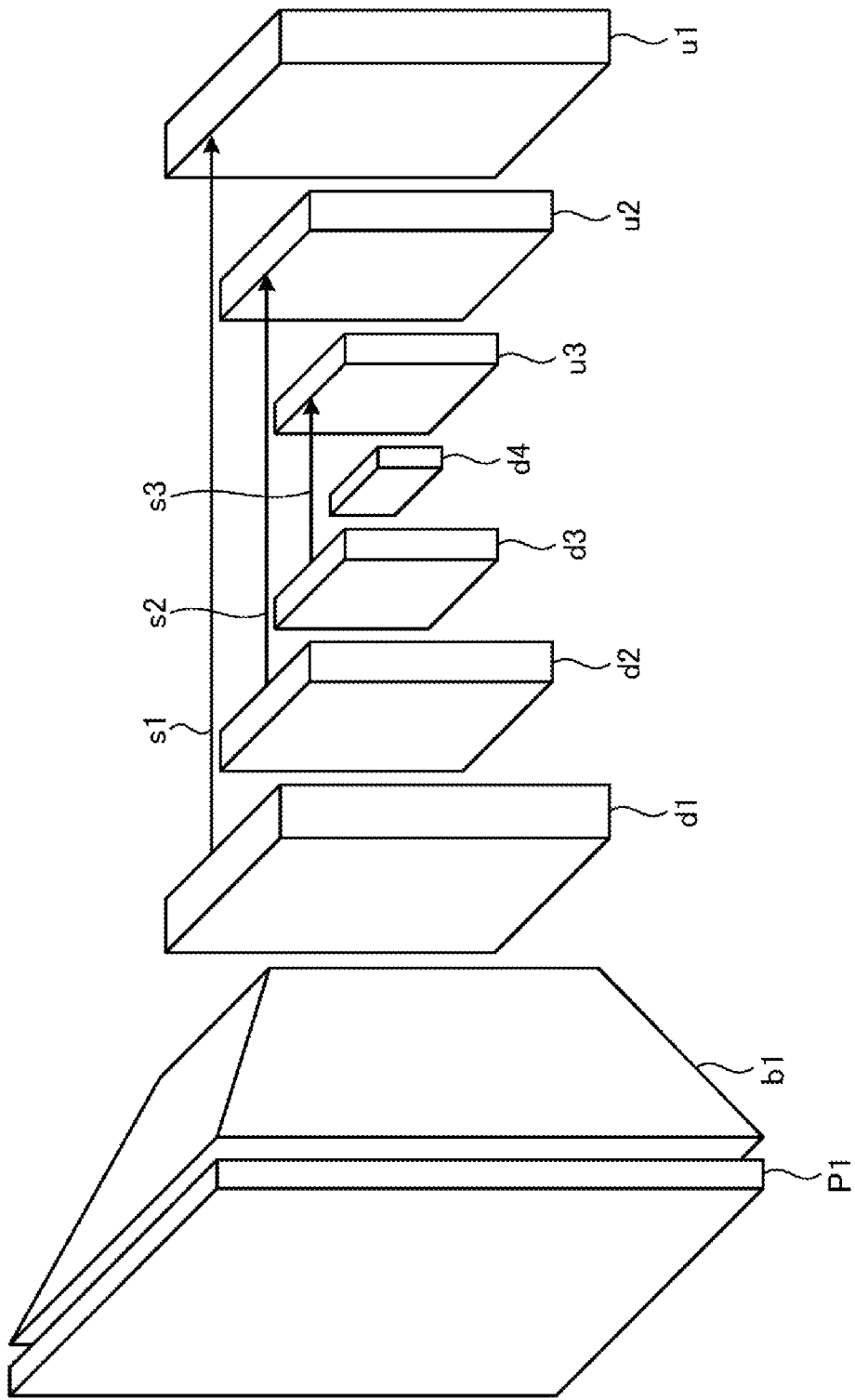
FIG. 8 is a diagram illustrating an example of a detection model according to the first embodiment.

Next, the estimation processing at the estimation section 152 will be described. The estimation section 152 extracts the feature of the object by using a model being an application of an object detection model with publicly known down-sampling, up sampling, and skip connection, for example. FIG. 8 is a diagram illustrating an example of a detection model according to the first embodiment. In the object detection model illustrated in FIG. 8, a d1 layer sections a random stack image P1 (320×320 pixels) into 40×40 vertical and horizontal grids by down-sampling through the convolutional neural network b1, and calculates a plurality of (for example, 256) features for each grid, for example. In addition, a d2 layer lower than the d1 layer sections the grids sectioned in the d1 layer into grids (for example, 20×20 grids) more coarsely than the d1 layer, and calculates the features of each grid. In the same manner, a d3 layer and a d4 layer lower than the d1 layer and the d2 layer section the grids sectioned in the d2 layer into grids more coarsely than the d2 layer. Through up sampling, the d4 layer calculates the features in finer sections, integrates the features with the features of the d3 layer through a skip connection s3, and thus generates a u3 layer. The skip connection may be simple addition or coupling of features, or conversion such as convolutional neural network may be additionally provided to the features of the d3 layer. In the same manner, a u2 layer is generated by integrating the features calculated through up sampling of the u3 layer and the features of the d2 layer through the skip connection s2. Further, a u1 layer is generated in the same manner. As a result, in the u1 layer, the features of each grid of 40×40 grids obtained by sectioning is calculated, as in the d1 layer.

Figure 9:
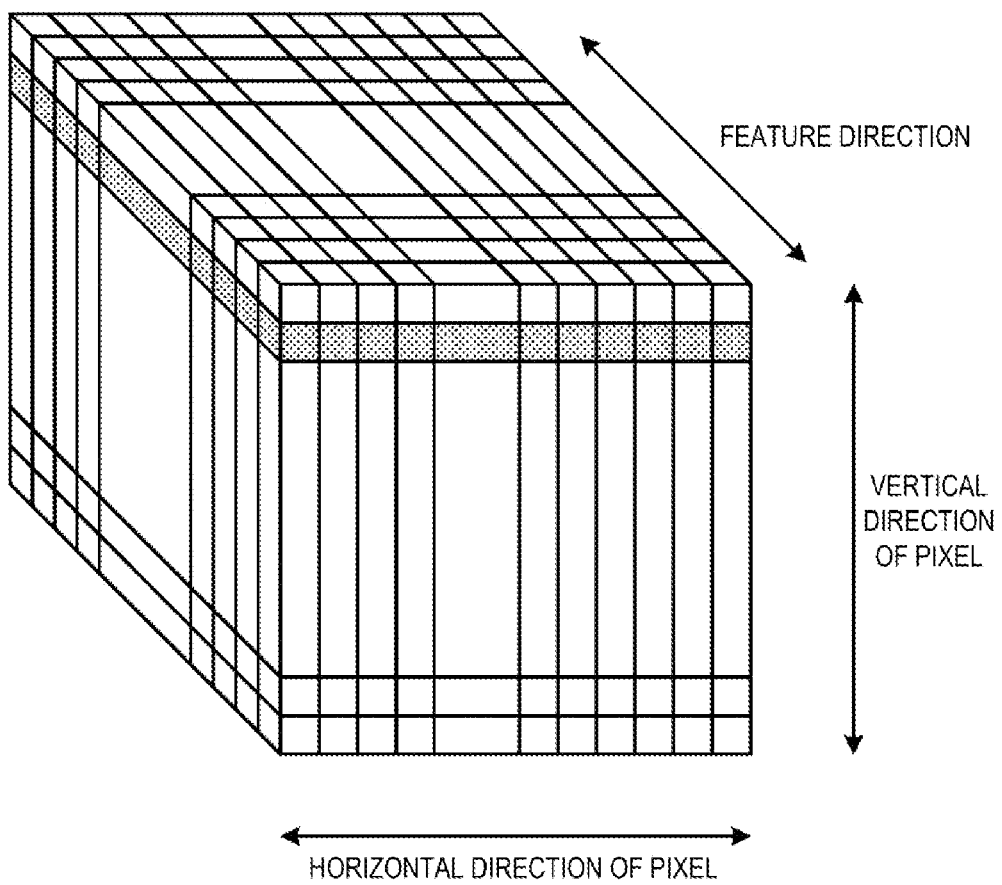
FIG. 9 is a diagram illustrating an example of a feature map output by a feature detection layer (u1) according to the first embodiment.

FIG. 9 is a diagram illustrating an example of a feature map output by the feature extraction layer (u1) according to the first embodiment. In the feature map illustrated in FIG. 9, the horizontal direction represents each grid in the horizontal direction of the random stack image P1 sectioned into 40×40 grids, and the vertical direction represents each grid in the vertical direction. In addition, in the feature map illustrated in FIG. 9, the depth direction represents the element of the feature in each grid.

Figure 10:
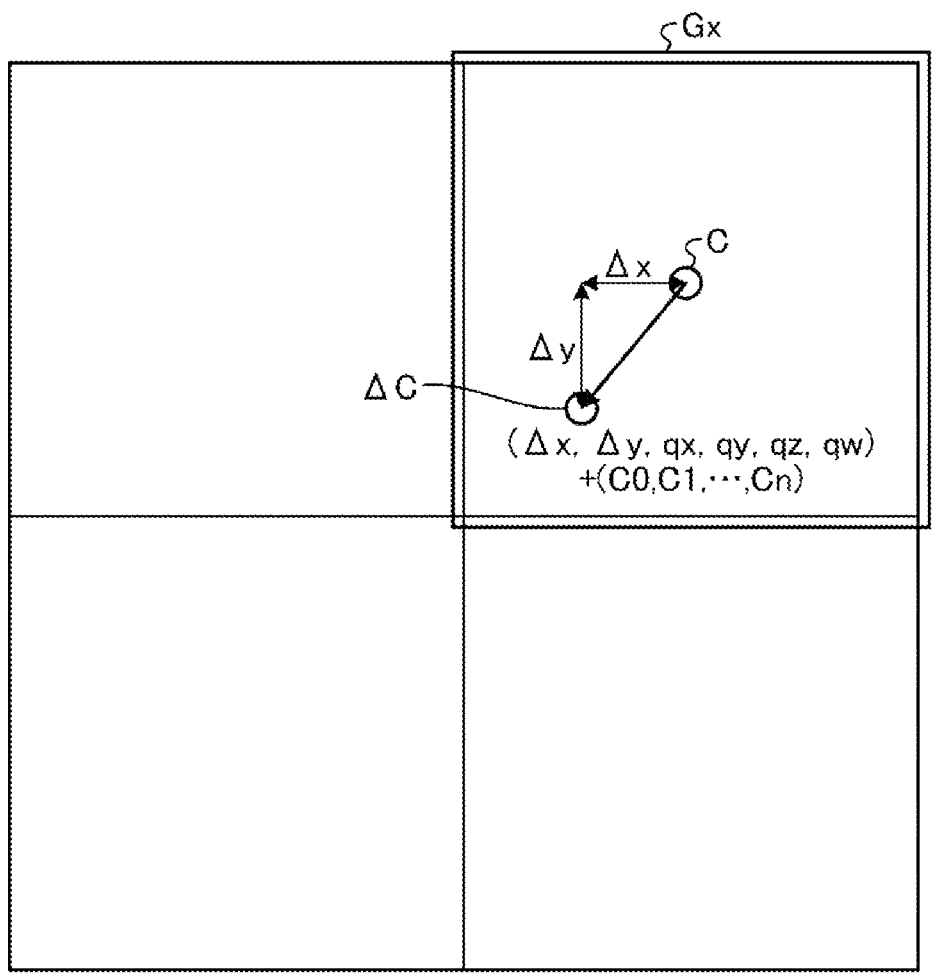
FIG. 10 is a diagram illustrating an example of an estimation result of a position and an orientation of an object according to the first embodiment.

FIG. 10 is a diagram illustrating an example of an estimation result of a position and an orientation of an object according to the first embodiment. As illustrated in FIG. 10, the estimation section outputs two-dimensional coordinates ($\Delta x$, $\Delta y$) representing the position of the object, the quaternion ($qx$, $qy$, $qz$, $qw$) representing the orientation of the object, and the score of classification ($C0, C1, \ldots, Cn$). Note that in the first embodiment, of the coordinates representing the position of the object, the depth value representing the distance from the camera 20 to the object is not calculated as the estimation result. The configuration for calculating the depth value will be described later. Note that here, the depth means the distance from the z-coordinate of the camera to the z-coordinate of the object in the z-axis direction parallel to the optical axis of the camera. Note that the score of classification is a value output for each grid, and the probability that the grid contains the center point of the object. For example, when the number of types of the objects is n, "the probability that the center point of the object is not contained" is added and as a result n+1 classification scores are output. For example, when the number of types of the workpieces as the objects is only one, two classification scores are output. In addition, when a plurality of objects are present in the same grid, the probability of the object stacked higher is output.

In FIG. 10, a point C represents the center of a grid Gx, and a point $\Delta C$ at the coordinates ($\Delta x$, $\Delta y$) represents the center point of the detected object, for example. Specifically, in the example illustrated in FIG. 10, the center of the object is offset from the point C of the grid Gx by $\Delta x$ in the x-axis direction and by $\Delta y$ in the y-axis direction.

Figure 11:
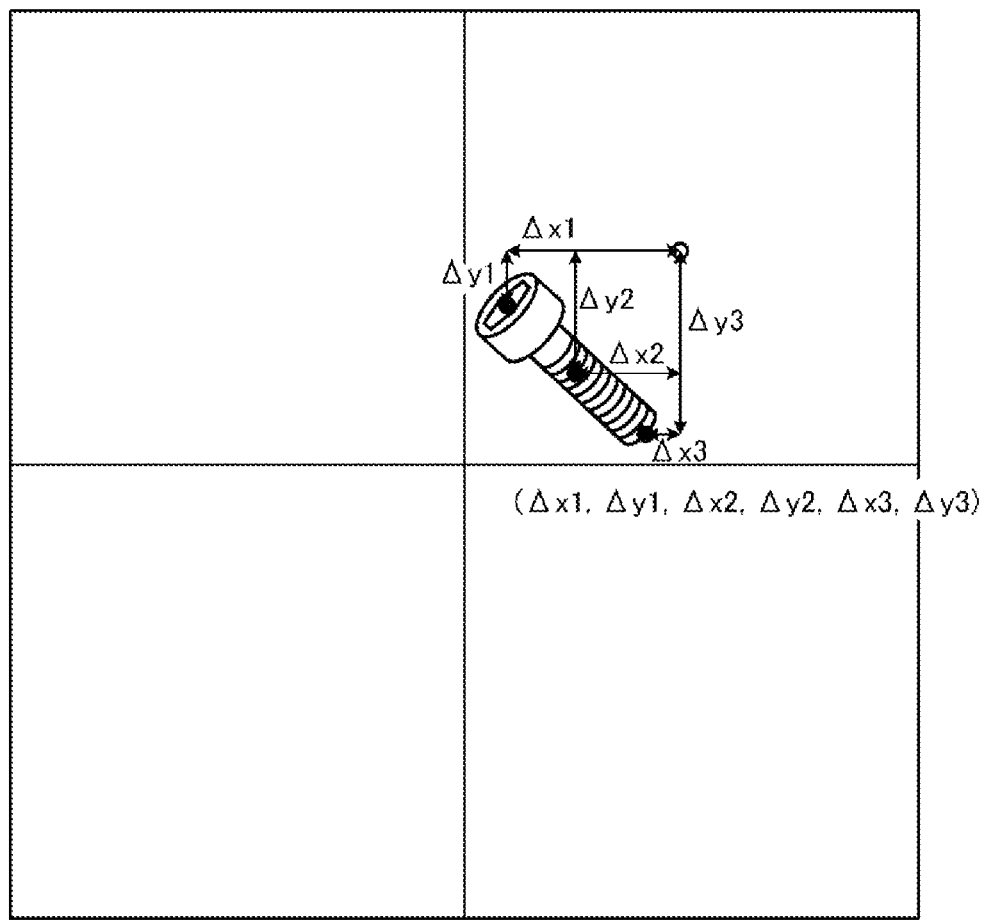
FIG. 11 is a diagram illustrating another example of an estimation result of a grasping position of an object according to the first embodiment.

Note that instead of FIG. 10, it is possible to set given points a, b and c other than the center of the object, and output the coordinates of the given points a, b and c ($\Delta x1$, $\Delta y1$, $\Delta z1$, $\Delta x2$, $\Delta y2$, $\Delta z2$, $x3$, $\Delta y3$, $\Delta z3$) from the point C of the center of the grid Gx, as illustrated in FIG. 11. Note that the given point may be set at any position of the object, and one or a plurality points may be set.

Note that when the sectioning of the grid is coarse with respect to the object size, a plurality of objects are included in one grid, and features of the objects may be mixed and erroneously detected. Therefore, a feature map being an output of the feature extraction layer (u1) for calculating the finally generated fine features (40×40 grids) is only used in the first embodiment.

Figure 12:
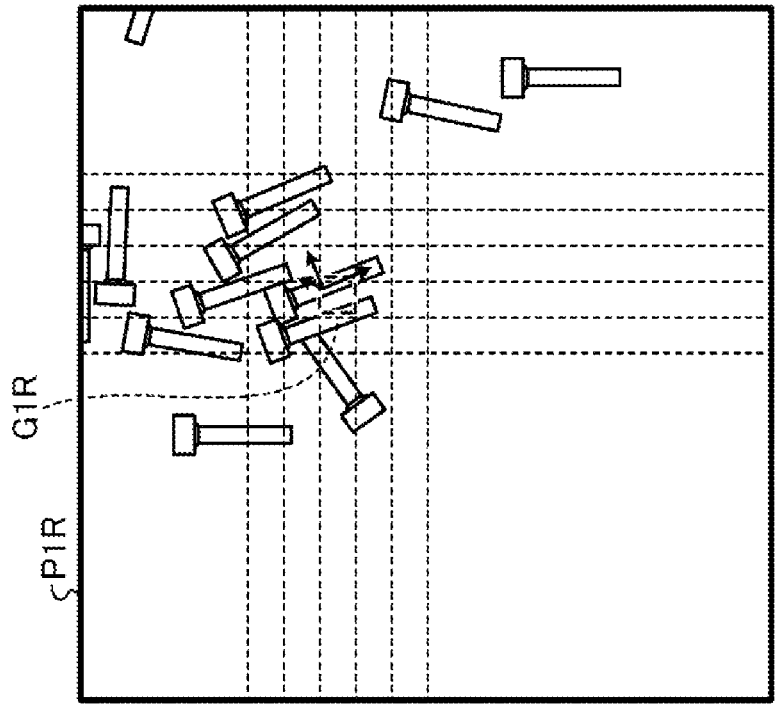
FIG. 12 is a diagram illustrating an example of random stack images captured by a stereo camera according to the first embodiment.
Figure 12:
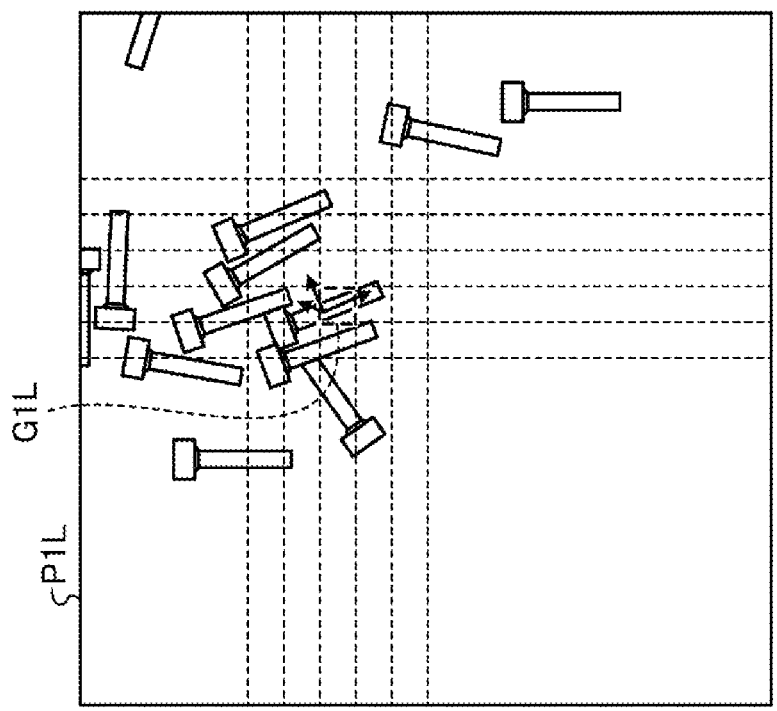

In addition, in the first embodiment, the distance from the camera 20 to the object is determined by capturing two, left and right, images by using a stereo camera, for example. FIG. 12 is a diagram illustrating an example of random stack images captured by a stereo camera according to the first embodiment. As illustrated in FIG. 12, the image acquiring section 151 acquires two types of random stack images, a left image P1L and a right image P1R. In addition, the estimation section 152 performs estimation processing using the learning model 141 on both the left image P1L and the right image P1R. Note that when the estimation processing is performed, a part or all of the learning parameter 141b used for the left image P1L may be shared as a weight for the right image P1R. Note that a single camera, instead of the stereo camera, may be used to capture images corresponding to the two left and right images at two positions by shifting the position of the camera.

Thus, the estimation section 152 of the first embodiment suppresses erroneous recognition of the object by using a matching map obtained by combining the features of the left image P1L and the features of the right image P1R. In the first embodiment, the matching map represents the strength of the correlation of the feature between the right image P1R and the left image P1L, for each feature. That is, use of the matching map enables matching between the left image P1L and the right image P1R to be achieved by focusing on the features in each image.

Figure 13:
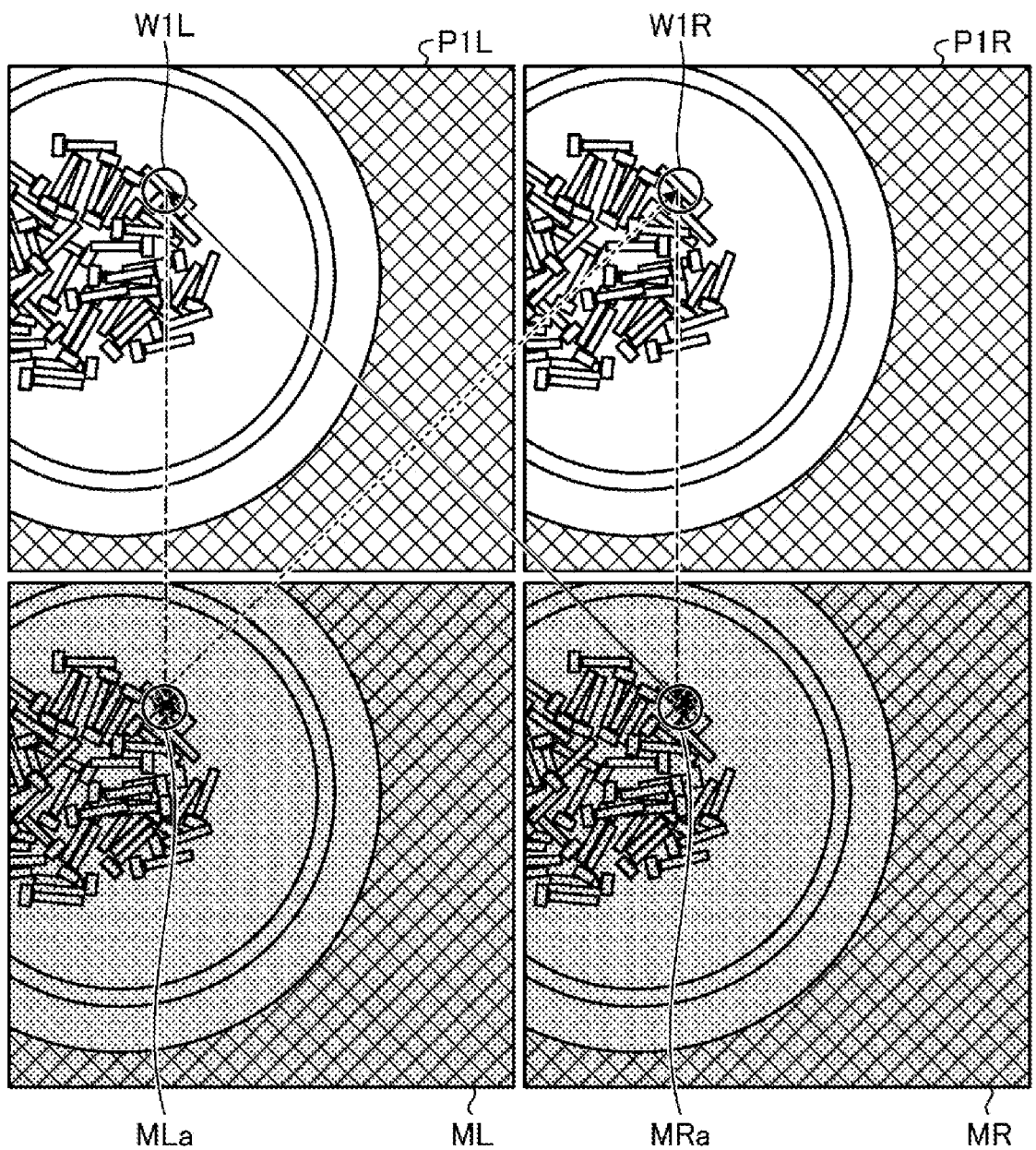
FIG. 13 is a diagram illustrating an example of a relationship between a random stack image and a matching map according to the first embodiment.

FIG. 13 is a diagram illustrating an example of a relationship between a random stack image and a matching map according to the first embodiment. As illustrated in FIG. 13, in a matching map ML where the left image P1L is used as a reference and a correspondence with the right image P1R is obtained, a grid MLa with the largest correlation between the features of the grid including the center point of an object WIL of the left image P1L and the features included in the right image P1R is displayed in an emphasized manner. Likewise, also in a matching map MR where the right image P1R is used as a reference and a correspondence with the left image P1L is obtained, a grid MRa with the largest correlation between the features of the grid including the center point of an object W1R of the right image P1R and the features included in the left image P1L is displayed in an emphasized manner. In addition, the grid MLa with the largest correlation in the matching map ML corresponds to the grid where the object WIL is located in the left image P1L, and the grid MRa with the largest correlation in the matching map MR corresponds to the grid where the object W1R is located in the right image P1R. In this manner, it can be determined that the grid where the object W1L is located in the left image P1L matches the grid where the object W1R is located in the right image P1R. Specifically, in FIG. 12, the matched grids are a grid G1L of the left image P1L and a grid G1R of the right image P1R. In this manner, the parallax for the object W1 can be determined based on the X coordinate of the object W1L in the left image P1L and the X coordinate of the object W1R in the right image P1R, and thus a depth z from the camera 20 to the object W1 can be determined.

Figure 14:
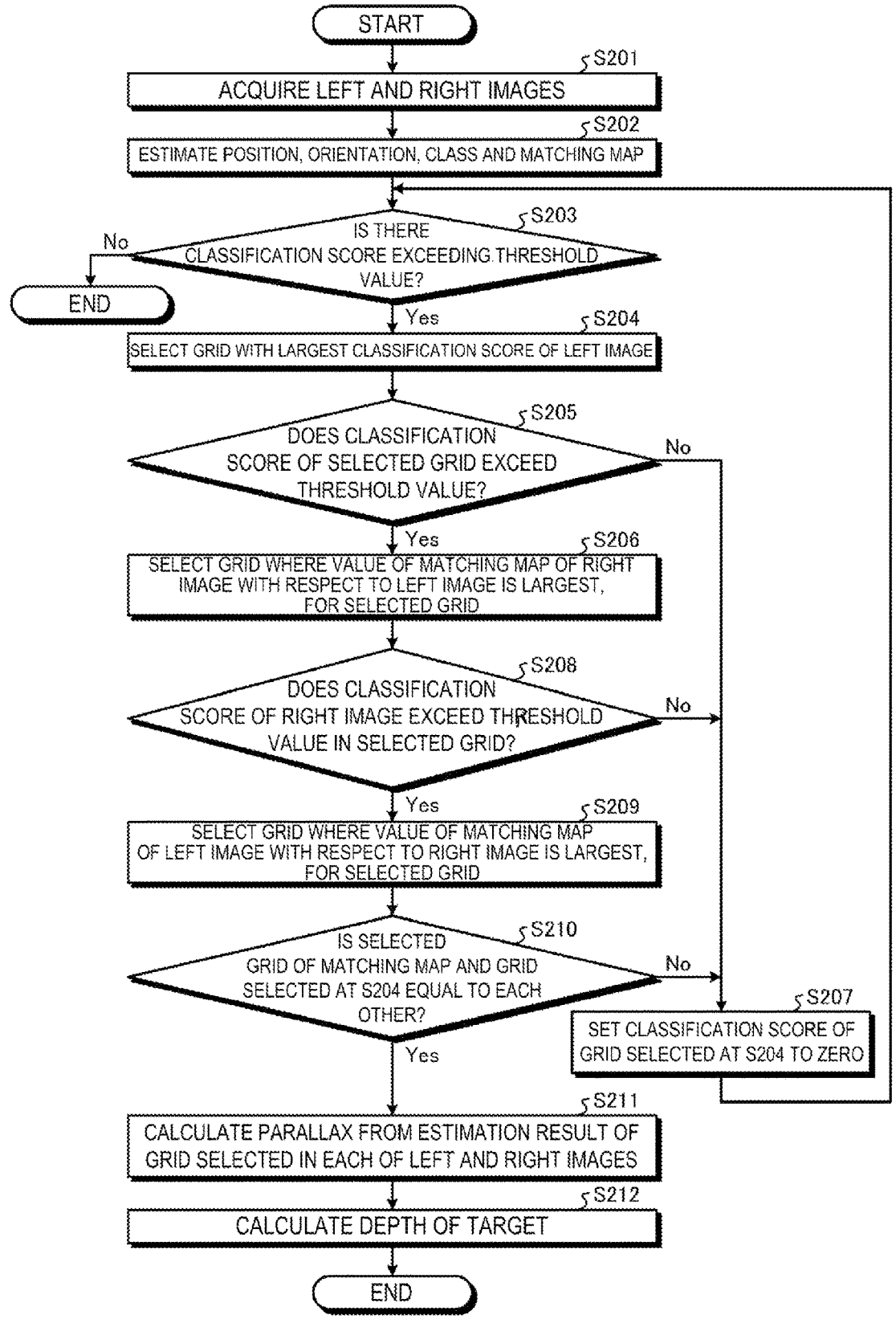
FIG. 14 is a flowchart illustrating an example of estimation processing according to the first embodiment.
Figure 15:
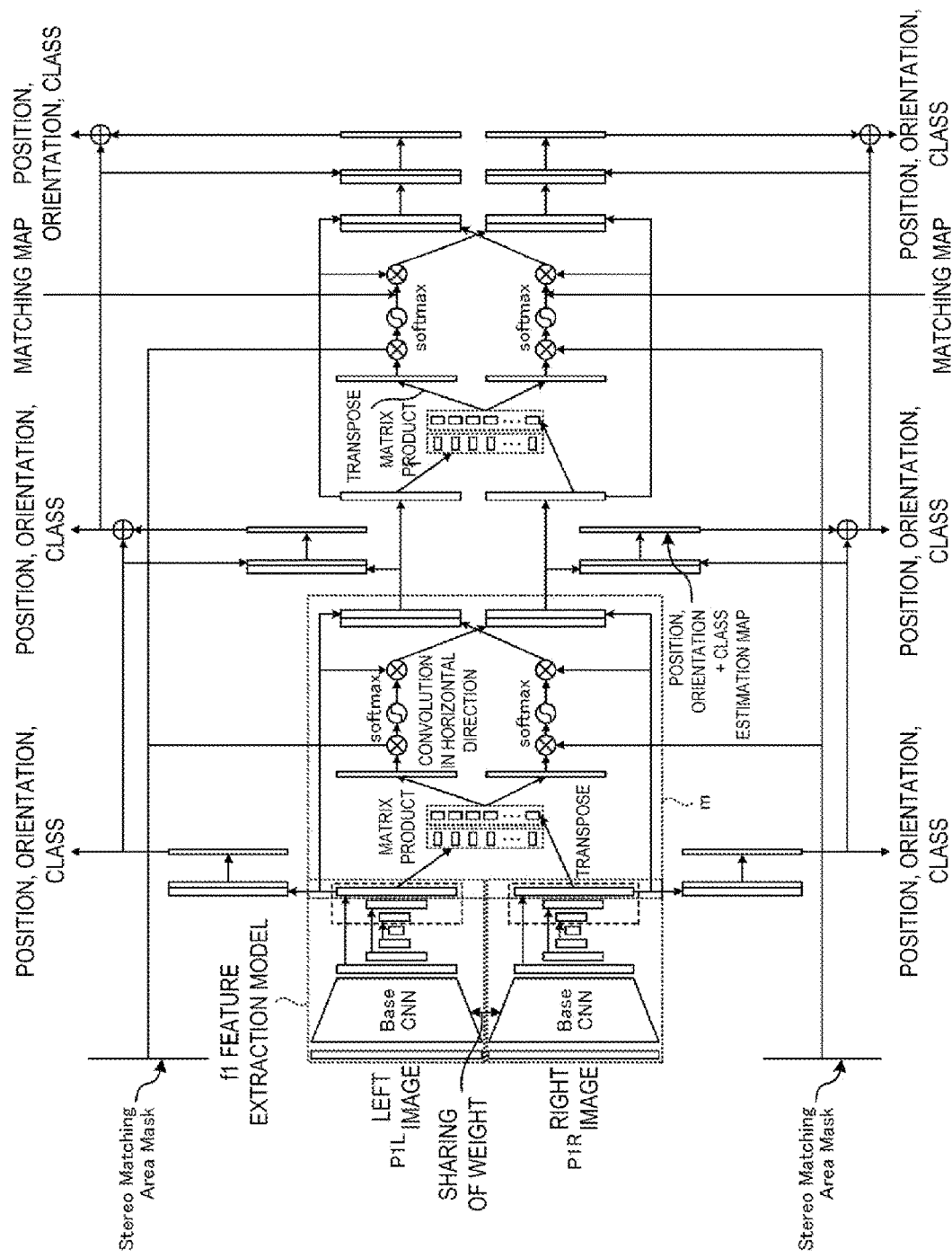
FIG. 15 is a diagram illustrating an example of the estimation processing according to the first embodiment.

FIG. 14 is a flowchart illustrating an example of the estimation processing according to the first embodiment. In addition, FIG. 15 is a diagram illustrating an example of the estimation processing according to the first embodiment. Descriptions will be made below with reference to FIG. 12 to FIG. 15. First, the image acquiring section 151 acquires left and right images of an object as with the left image P1L and the right image P1R illustrated in FIG. 12 (step S201). Next, the estimation section 152 calculates the features for each grid in the horizontal direction of the left and right images. Here, when each image is sectioned into 40×40 grids and 256 features are calculated for each grid as described above, a matrix of 40 rows and 40 columns as expressed in the first term and the second term on the left side in Expression (1) is obtained in the horizontal direction of each image.

[Math 1]

$$\begin{bmatrix} l_{11} & l_{12} & \cdots & l_{1n} \\ l_{21} & l_{22} & \cdots & l_{2n} \\ \vdots & \vdots & \ddots & \vdots \\ l_{m1} & l_{m2} & \cdots & l_{mn} \end{bmatrix} \begin{bmatrix} r_{11} & r_{21} & \cdots & r_{m1} \\ r_{12} & r_{22} & \cdots & r_{m2} \\ \vdots & \vdots & \ddots & \vdots \\ r_{1n} & r_{2n} & \cdots & r_{mn} \end{bmatrix} =$$

$$\begin{bmatrix} c_{11} & c_{12} & \cdots & c_{1m} \\ c_{21} & c_{22} & \cdots & c_{2m} \\ \vdots & \vdots & \ddots & \vdots \\ c_{m1} & c_{m2} & \cdots & c_{mm} \end{bmatrix} \quad \text{Expression (1)}$$

Next, the estimation section 152 performs processing m illustrated in FIG. 15. First, with Expression (1), the estimation section 152 calculates a matrix product of the features of a specific column extracted from the left image P1L and a transpose of the features of the same column extracted from the right image P1R, for example. In the first term on the left side in Expression (1), the features l11 to l1$n$ of the first grid in the horizontal direction of a specific column of the left image P1L are arranged in the row direction. On the other hand, in the second term on the left side in Expression (1), the features r11 to r1$n$ of the first grid in the horizontal direction of a specific column of the right image P1R are arranged in the column direction. That is, the matrix of the second term on the left side is the transpose of the matrix where the features r11 to r1$m$ of the grid in the horizontal direction of the specific column of the right image P1R are arranged in the row direction. In addition, the right side in Expression (1) is a result of calculation of the matrix product of the matrix of the first term on the left side and the matrix of the second term on the left side. In Expression (1), the first column on the right side represents a correlation between the features of the first grid extracted from the right image P1R and the features of each grid in the horizontal direction of a specific column extracted from the left image P1L, and the first row represents a correlation between the features of the first grid extracted from the left image P1L and the features of each grid in the horizontal direction of a specific column extracted from the right image P1R. That is, the right side in Expression (1) represents a correlation map between the features of each grid of the left image P1L and the features of each grid of the right image P1R. Note that in Expression (1), the subscript "m" represents the position of the grid of each image in the horizontal direction, and the subscript "n" represents the number of the feature in each grid. Specifically, m is 1 to 40, and n is 1 to 256.

Next, the estimation section 152 calculates the matching map ML of the right image P1R with respect to the left image P1L as expressed in the matrix (1) by using the calculated correlation map. The matching map ML of the right image P1R with respect to the left image P1L is calculated by applying Softmax function to the row direction of the correlation map, for example. In this manner, the correlation value in the horizontal direction is normalized. That is, the conversion is made such that the sum of the values in the row direction is 1.

[Math 2]

$$\begin{bmatrix} \frac{e^{C_{11}}}{\sum_{i=1}^{m} C_{1i}} & \frac{e^{C_{12}}}{\sum_{i=1}^{m} C_{1i}} & \cdots & \frac{e^{C_{1m}}}{\sum_{i=1}^{m} C_{1i}} \\ \frac{e^{C_{21}}}{\sum_{i=1}^{m} C_{2i}} & \frac{e^{C_{22}}}{\sum_{i=1}^{m} C_{2i}} & \cdots & \frac{e^{C_{2m}}}{\sum_{i=1}^{m} C_{2i}} \\ \vdots & \vdots & \ddots & \vdots \\ \frac{e^{C_{m1}}}{\sum_{i=1}^{m} C_{mi}} & \frac{e^{C_{m2}}}{\sum_{i=1}^{m} C_{mi}} & \cdots & \frac{e^{C_{mm}}}{\sum_{i=1}^{m} C_{mi}} \end{bmatrix} \quad \text{Matrix (1)}$$

Next, the estimation section 152 convolves the features extracted from the right image P1R to the calculated matching map ML by Expression (2), for example. In. Expression (2), the first term on the left side is a transpose of the matrix (1), and the second term on the left side is the matrix of the first term on the left side in Expression (1). Note that while the features for the correlation and the features for the convolution to the matching map are the same in the present invention, features for new correlation obtained from extracted features through a convolutional neural network and the like may be generated separately from features for convolution.

Next, the estimation section 152 generates new features by, for example, a convolutional neural network by coupling the features obtained by Expression (2) with the features extracted from the left image P1L. By integrating the features of the left and right images in the above-described manner, the estimation accuracy of the position and the orientation is improved. Note that the processing m in FIG. 15 may be repeated multiple times.

[Math 3]

$$\begin{bmatrix} \frac{e^{C_{11}}}{\sum_{i=1}^{m} C_{1i}} & \frac{e^{C_{12}}}{\sum_{i=1}^{m} C_{1i}} & \cdots & \frac{e^{C_{1m}}}{\sum_{i=1}^{m} C_{1i}} \\ \frac{e^{C_{21}}}{\sum_{i=1}^{m} C_{2i}} & \frac{e^{C_{22}}}{\sum_{i=1}^{m} C_{2i}} & \cdots & \frac{e^{C_{2m}}}{\sum_{i=1}^{m} C_{2i}} \\ \vdots & \vdots & \ddots & \vdots \\ \frac{e^{C_{m1}}}{\sum_{i=1}^{m} C_{mi}} & \frac{e^{C_{m2}}}{\sum_{i=1}^{m} C_{mi}} & \cdots & \frac{e^{C_{mm}}}{\sum_{i=1}^{m} C_{mi}} \end{bmatrix} \begin{bmatrix} r_{11} & r_{12} & \cdots & r_{1n} \\ r_{21} & r_{22} & \cdots & r_{2n} \\ \vdots & \vdots & \ddots & \vdots \\ r_{m1} & r_{m2} & \cdots & r_{mn} \end{bmatrix} =$$

$$\begin{bmatrix} \sum_{j=1}^{m} \frac{e^{C_{1j}}}{\sum_{i=1}^{m} C_{1i}} r_{j1} & \sum_{j=1}^{m} \frac{e^{C_{1j}}}{\sum_{i=1}^{m} C_{1i}} r_{j2} & \cdots & \sum_{j=1}^{m} \frac{e^{C_{1j}}}{\sum_{i=1}^{m} C_{1i}} r_{jn} \\ \sum_{j=1}^{m} \frac{e^{C_{2j}}}{\sum_{i=1}^{m} C_{2i}} r_{j1} & \sum_{j=1}^{m} \frac{e^{C_{2j}}}{\sum_{i=1}^{m} C_{2i}} r_{j2} & \cdots & \sum_{j=1}^{m} \frac{e^{C_{2j}}}{\sum_{i=1}^{m} C_{2i}} r_{jn} \\ \vdots & \vdots & \ddots & \vdots \\ \sum_{j=1}^{m} \frac{e^{C_{mj}}}{\sum_{i=1}^{m} C_{mi}} r_{j1} & \sum_{j=1}^{m} \frac{e^{C_{mj}}}{\sum_{i=1}^{m} C_{mi}} r_{j2} & \cdots & \sum_{j=1}^{m} \frac{e^{C_{mj}}}{\sum_{i=1}^{m} C_{mi}} r_{jn} \end{bmatrix} \quad \text{Expression (2)}$$

Next, from the features obtained here, the estimation section 152 estimates the position, the orientation, and the classification by a convolutional neural network, for example. Additionally, the estimation section 152 calculates the matching map MR of the left image P1L with respect to the right image P1R as expressed in the matrix (2) by using the calculated correlation map (step S202). As with the matching map ML of the right image P1R with respect to the left image P1L, the matching map MR of the left image P1L with respect to the right image P1R is also calculated by applying Softmax function to the row direction of correlation map, for example.

[Math 4]

$$\begin{bmatrix} \dfrac{e^{C_{11}}}{\sum_{k=1}^{m} C_{i1}} & \dfrac{e^{C_{21}}}{\sum_{k=1}^{m} C_{i1}} & \cdots & \dfrac{e^{C_{m1}}}{\sum_{k=1}^{m} C_{i1}} \\ \dfrac{e^{C_{12}}}{\sum_{k=1}^{m} C_{i2}} & \dfrac{e^{C_{22}}}{\sum_{k=1}^{m} C_{i2}} & \cdots & \dfrac{e^{C_{m2}}}{\sum_{k=1}^{m} C_{i2}} \\ \vdots & \vdots & \ddots & \vdots \\ \dfrac{e^{C_{1m}}}{\sum_{k=1}^{m} C_{im}} & \dfrac{e^{C_{2m}}}{\sum_{k=1}^{m} C_{im}} & \cdots & \dfrac{e^{C_{mm}}}{\sum_{k=1}^{m} C_{im}} \end{bmatrix} \quad \text{Matrix (2)}$$

Next, the estimation section 152 convolves the features of the left image P1L to the calculated matching map by Expression (3), for example. In Expression (3), the first term on the left side is the matrix (2), and the second term on the left side is the matrix of the second term on the left side in Expression (1) before the transpose.

[Math 5]

$$\begin{bmatrix} \dfrac{e^{C_{11}}}{\sum_{i=1}^{m} C_{1i}} & \dfrac{e^{C_{12}}}{\sum_{i=1}^{m} C_{1i}} & \cdots & \dfrac{e^{C_{1m}}}{\sum_{i=1}^{m} C_{1i}} \\ \dfrac{e^{C_{21}}}{\sum_{i=1}^{m} C_{2i}} & \dfrac{e^{C_{22}}}{\sum_{i=1}^{m} C_{2i}} & \cdots & \dfrac{e^{C_{2m}}}{\sum_{i=1}^{m} C_{2i}} \\ \vdots & \vdots & \ddots & \vdots \\ \dfrac{e^{C_{m1}}}{\sum_{i=1}^{m} C_{mi}} & \dfrac{e^{C_{m2}}}{\sum_{i=1}^{m} C_{mi}} & \cdots & \dfrac{e^{C_{mm}}}{\sum_{i=1}^{m} C_{mi}} \end{bmatrix} \begin{bmatrix} l_{11} & l_{12} & \cdots & l_{1n} \\ l_{21} & l_{22} & \cdots & l_{2n} \\ \vdots & \vdots & \ddots & \vdots \\ l_{m1} & l_{m2} & \cdots & l_{mn} \end{bmatrix} =$$

$$\begin{bmatrix} \sum_{j=1}^{m} \dfrac{e^{C_{j1}}}{\sum_{i=1}^{m} C_{i1}} l_{j1} & \sum_{j=1}^{m} \dfrac{e^{C_{j1}}}{\sum_{i=1}^{m} C_{i1}} l_{j2} & \cdots & \sum_{j=1}^{m} \dfrac{e^{C_{j1}}}{\sum_{i=1}^{m} C_{i1}} l_{jn} \\ \sum_{j=1}^{m} \dfrac{e^{C_{j2}}}{\sum_{i=1}^{m} C_{i2}} l_{j1} & \sum_{j=1}^{m} \dfrac{e^{C_{j2}}}{\sum_{i=1}^{m} C_{i2}} l_{j2} & \cdots & \sum_{j=1}^{m} \dfrac{e^{C_{j2}}}{\sum_{i=1}^{m} C_{2i}} l_{jn} \\ \vdots & \vdots & \ddots & \vdots \\ \sum_{j=1}^{m} \dfrac{e^{C_{jm}}}{\sum_{i=1}^{m} C_{im}} l_{j1} & \sum_{j=1}^{m} \dfrac{e^{C_{jm}}}{\sum_{i=1}^{m} C_{im}} l_{j2} & \cdots & \sum_{j=1}^{m} \dfrac{e^{C_{jm}}}{\sum_{i=1}^{m} C_{im}} l_{jn} \end{bmatrix}$$

Expression (3)

Next, the estimation section 152 selects the grid with the largest estimation result of the classification of the target (object) estimated from the left image P1L and compares the selected grid with a preliminarily set threshold value (step S203). When the threshold value is not exceeded, it is determined that there is no target, and the processing is terminated. When the threshold value is exceeded, the grid with the largest value is selected from the matching map ML with the right image P1R for the grid (step S204).

Next, in the selected grid, the estimation result of the classification of the target of the right image P1R is compared with a preliminarily set threshold value (step S208). When the threshold value is exceeded, the grid with the largest value is selected from the matching map ML with the left image P1L for the grid (step S209). When the threshold value is not exceeded, the classification score of the grid selected from the estimation result of the left image P1L is set to 0, and the processing is returned to step S203 (step S207).

Next, the grid of the matching map ML selected at step S209 and the grid selected from the estimation result of the left image P1L at step S204 are compared with each other regarding whether these grids are equal (step S210). When the grids are different, the classification score of the grid selected from the estimation result of the left image P1L at step S204 is set to 0, and the processing is returned to the selection of the grid of step S203 (step S207). Finally, the parallax is calculated from the detection result of the location information (for example, the value in horizontal direction x in FIG. 1) of the grid selected in the left image P1L and the right image P1R (step S211).

Next, the depth of the target is calculated based on the parallax calculated from step S211 (step S212). Note that when the depths of a plurality of targets are calculated, it is only required to set the classification score of the grid selected from the estimation result of the left image P1L and the right image P1R to 0 after step S211, return to step S203, and then repeat the processing until step S212.

As described above, the image processing device 10 of the first embodiment includes an acquiring section and an estimation section. The acquiring section acquires a first image and a second image obtained by capturing randomly stacked workpieces. The estimation section generates a matching map of a feature of the first image and a feature of the second image, estimates a position, an orientation, and a classification score of each workpiece as a target for each of the first image and the second image, and estimates the position of the workpiece based on the matching result using the attention map and the estimation result of the position to calculate the depth from the stereo camera to the workpiece. In this manner, detection errors in object recognition can be suppressed.

Modification Example

Figure 16:
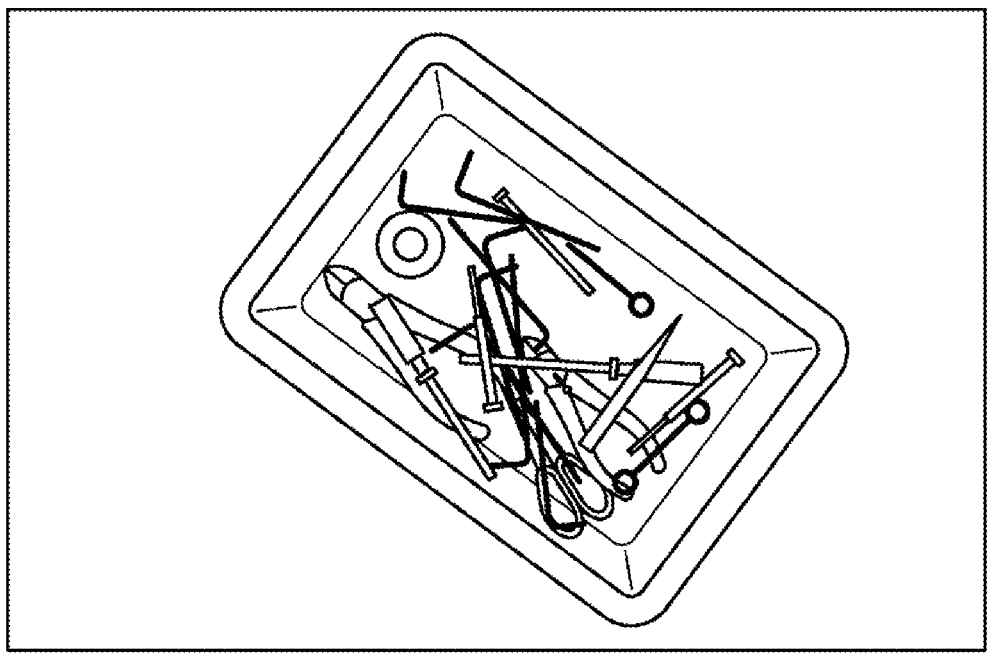
FIG. 16 is a diagram illustrating an example of a random stack image including a tray according to a modification example.

Embodiments of the present invention have been described above, but the present invention is not limited to the embodiments described above, and various modifications are possible without departing from the spirit of the present invention. For example, while the case where the number of types of the objects (workpieces) is one has been described in the first embodiment, the embodiment is not limited to this, and the image processing device 10 may be configured to detect a plurality of types of workpieces. In addition, the image processing device 10 may detect not only the object, but also the position and the orientation of a tray and the like where the object is disposed. FIG. 16 is a diagram illustrating an example of a random stack image including a tray according to a modification example. In the example illustrated in FIG. 16, the image processing device 10 can set the trajectory such that the robot arm 30 does not collide with the tray by determining the position and the orientation of the tray where the object is disposed. Note that the tray being the detection target is an example of an obstacle. The image processing device 10 may be configured to detect obstacles other than the tray.

Figure 17:
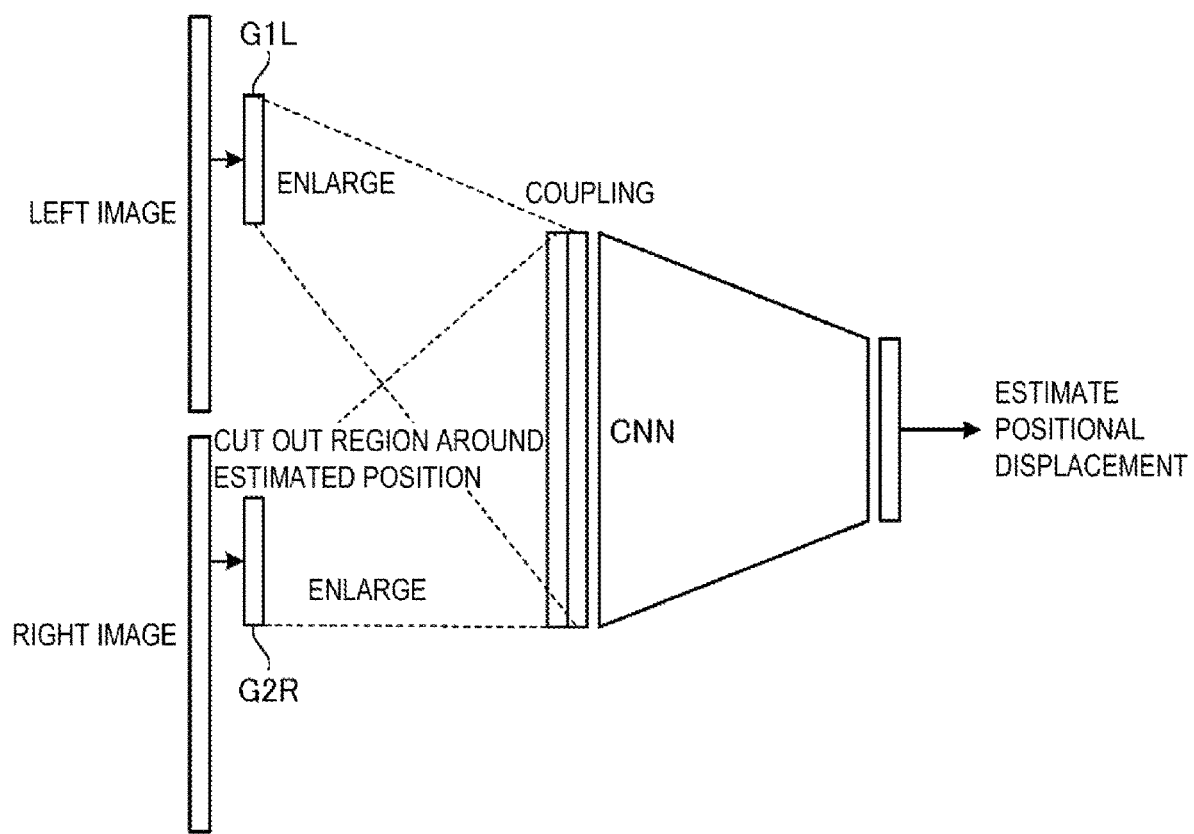
FIG. 17 is a diagram illustrating an example of a positional displacement estimation model according to the modification example.

In addition, while an example of sectioning, by the image processing device 10, a random stack image into 40×40 grids has been described, the embodiment is not limited to this, and the image processing device 10 may section the image into grids more finely or coarsely to detect the object, or may perform the estimation processing pixel by pixel. In this manner, the image processing device 10 can more accurately calculate the distance between the camera and the object. FIG. 17 is a diagram illustrating an example of a positional displacement estimation model according to the modification example. As illustrated in FIG. 17, the image processing device 10 may cut out and couple a portion having a smaller size than the grid around the estimated position in the left image P1L and the right image P1R. Then, the same estimation processing as the estimation processing of the first embodiment may be performed, and the positional displacement may be estimated on the basis of the processing result.

Figure 18:
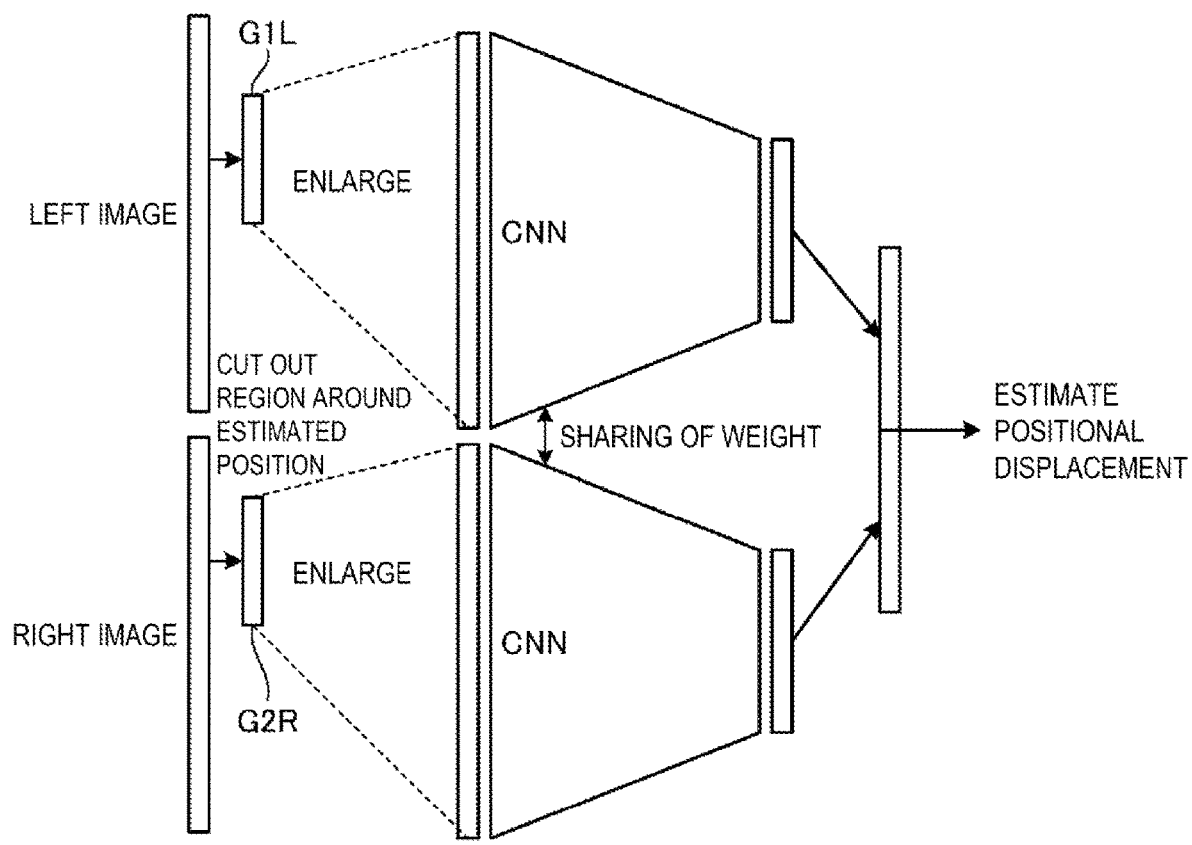
FIG. 18 is a diagram illustrating another example of the positional displacement estimation model according to the modification example.

In addition, when the estimation processing is performed in a fine or coarse grid unit or pixel unit, the estimation processing may be performed separately for each of the left image P1L and the right image P1R as in the first embodiment. FIG. 18 is a diagram illustrating another example of the positional displacement estimation model according to the modification example. In the example illustrated in FIG. 18, the image processing device 10 performs the estimation processing for each of the left image P1L and the right image P1R separately. Also in this case, as in the first embodiment, the image processing device 10 may share the weight of the left image P1L with the weight of the right image P1R when performing each estimation processing.

In addition, the above-described estimation processing may be performed on the robot arm 30, the workpieces 41 and 42 held by the robot arm 30, or the workpieces 41 and 42 aligned at the alignment destination, instead of the image of the randomly stacked workpieces 41 and 42.

Moreover, the present invention is not limited to the embodiment described above. A configuration obtained by appropriately combining the above-mentioned constituent elements is also included in the present invention. Further effects and modification examples can be easily derived by a person skilled in the art. Thus, a wide range of aspects of the present invention is not limited to the embodiment described above, and may be modified variously.

REFERENCE SIGNS LIST

1 Object grasping system
10 Image processing device
20 Camera
30 Robot arm
41, 42 Workpiece

The invention claimed is:

1. An image processing device comprising:
an acquiring section configured to acquire a first image and a second image obtained by capturing randomly stacked workpieces; and
an estimation section configured to generate a matching map of a feature of the first image and a feature of the second image, estimate a position, an orientation and a classification score of each workpiece as a target for each of the first image and the second image, and estimate the position of the workpiece, based on a matching result using the matching map and an estimation result of the position.

2. The image processing device according to claim 1, wherein
the acquiring section is a stereo camera; and
the estimation section calculates a depth of the workpiece from the stereo camera.

3. The image processing device according to claim 1, wherein the estimation section further detects an obstacle other than the workpiece in at least one of the first image and the second image.

4. An image processing method comprising:
by a computer, acquiring a first image and a second image obtained by capturing randomly stacked workpieces; and
by the computer, generating a matching map of a feature of the first image and a feature of the second image, estimating a position, an orientation and a classification score of each workpiece as a target for each of the first image and the second image, and estimating the position of the workpiece, based on a matching result using the matching map and an estimation result of the position.

* * * * *